United States Patent [19]

Bunsen

[11] Patent Number: 5,155,697
[45] Date of Patent: Oct. 13, 1992

[54] MOST PRECISE FRACTION DISPLAY METHOD

[75] Inventor: Chris M. Bunsen, Corvallis, Oreg.

[73] Assignee: Hewlett-Packard Company, Palo Alto, Calif.

[21] Appl. No.: 648,120

[22] Filed: Jan. 31, 1991

[51] Int. Cl.⁵ .............................................. G06F 3/00
[52] U.S. Cl. ............................................... 364/709.07
[58] Field of Search .................... 364/709.01, 709.07

[56] References Cited

U.S. PATENT DOCUMENTS

| | | | |
|---|---|---|---|
| 4,081,859 | 3/1978 | Goldsamt et al. | 364/709 |
| 4,545,022 | 10/1985 | Hughins | 364/709 |
| 4,744,044 | 5/1988 | Stover et al. | 364/709 X |
| 5,025,403 | 6/1991 | Stephens | 364/709.07 |

FOREIGN PATENT DOCUMENTS 52-38857  3/1977  Japan ............................. 364/709.07

*Primary Examiner*—Long T. Nguyen

[57] ABSTRACT

In a calculating device, a method for calculating a fraction that most accurately represents a related decimal value stored within the device. The user may select a maximum denominator value to limit the amount of calculation involved.

8 Claims, 2 Drawing Sheets

MOST PRECISE FRACTION DISPLAY METHOD

FIELD OF THE INVENTION

The present invention relates to a method in a calculating device for calculating and displaying a fraction that most accurately represents a corresponding decimal value stored within the device.

BACKGROUND AND SUMMARY OF THE INVENTION

Typically, in computational and measurement apparatus which calculate and display numeric results in the pure fractional format "b/c" (where b and c are integers and respectively represent the numerator and denominator of a fraction), the user of such apparatus is given the option to specify a default denominator to the memory or display. By way of example, if a user were working with length measurements, the user might wish to see results in 16ths. Accordingly, the "c" value (of "b/c") would be set to "16" and all subsequent fraction results will be displayed in 16ths. Unfortunately, in this operation some type of numerical round-off error will occur with respect to the number displayed.

Most fraction calculating techniques will return a fraction whose denominator represents a factor of the stored denominator, i.e., "to the nearest 16th". However, a fixed denominator value of 16 will not permit fraction resolution into thirds, fifths, sevenths and so on even though those fractions may be more accurate than the set fractional value. Other fraction calculating techniques resolve fractions and compare successive representations to a floating point comparison of the decimal values. This operation offers no control over the size of the resulting formatted denominator.

It is therefor an object of the present invention to provide a fraction display mode that, given a decimal (floating-point) value, will display the most accurate fraction representing the value. The displayed fraction will be the most accurate possible where the denominator does not exceed a stored maximum denominator. This allows for a resulting fraction whose denominator is not a factor of the stored denominator.

The present invention uses the method of continued fractions on a term by term basis, comparing the calculated denominator of each term summation against the stored denominator. If more terms exist, and the calculated denominator has not been exceeded, another term is calculated. This method produces a fraction that is already reduced, and each iteration will be more and more accurate until the fraction is perfect or the tolerance is exceeded.

The foregoing and additional features and advantages of the present invention will be more readily apparent from the following detailed description, which proceeds with reference to the accompanying drawings.

DETAILED DESCRIPTION OF A PREFERRED EMBODIMENT

The Apparatus

Figure 1:
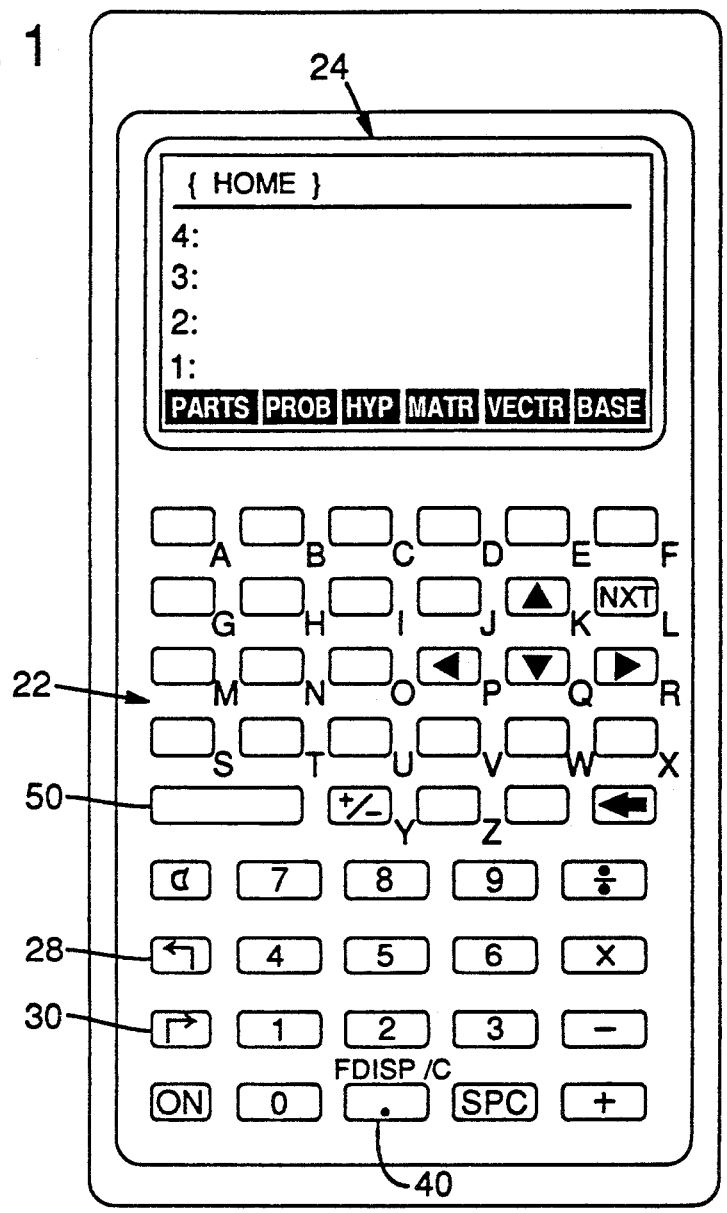
FIG. 1 shows the keyboard and display of a calculating device in accordance with a preferred embodiment of the present invention.
Figure 2:
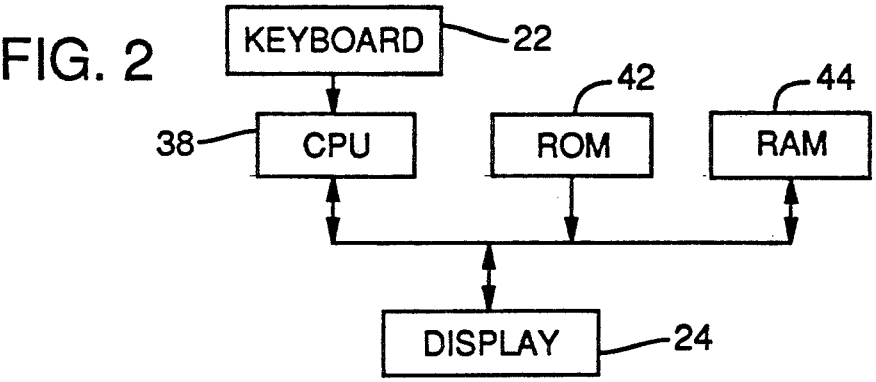
FIG. 2 shows the internal architecture of the calculating device of FIG. 1.

FIG. 1 shows a typical calculator 20 for use with the present invention. The hardware and architecture of the calculator 20 (shown in FIG. 2) may be of conventional design. The calculator includes an entry means such as a keyboard 22 and a display means such as an LCD display 24. On the face of the keyboard are a plurality of keys that each have a number of functions. Relevant to the present invention are a number of keys to be described.

The architecture of calculator 20 includes a central processing unit (CPU) 38 to which are connected via various buses the keyboard 22, the display 24 and memory in the form of ROM 42 and RAM 44. The instructions for operating the CPU are written and stored in the ROM 42 in a conventional manner. The RAM 44 is available for storing data entered via the keyboard 22 and generated by the CPU 38 in the process of performing computations according to the invention. Flag and stack registers are also typically provided in other memory associated with the CPU 38.

It will be understood that any equivalent calculating device may be used, such as a general purpose computer. Equivalent to the keyboard would be any data entry device such as a mouse. Equivalent to the LCD display would be any type of display device such as a CRT, hard copy device, etc.

Entering Fractions

As contemplated in the present invention, fractions are real numbers of the form:

"a b/c" or "b/c"

where, a, b, and c are integers. Fractions can be entered onto a memory stack register at any time. A fraction entry method is the subject of a co-pending application for a DOUBLE KEYSTROKE FRACTION ENTRY AND INTERFACE, Ser. No. 648,680, assigned to the present assignee and incorporated herein by reference.

Using the above-enumerated procedure, a user may enter almost any number as a fraction on the keyboard 22 of the calculator 20. This includes an improper fraction where the numerator is larger than the denominator. However, a typical calculator 20 will display an error sign if the user disregards embodiment architecture restrictions.

Displaying Fractions

When the calculator 20 used with the contemplated invention is initially energized, embodiment architecture will cause any entered numbers to be displayed in decimal format. The decimal-display mode is the default display mode. When the user desires to implement mathematical equations incorporating pure fractional numbers in the form "a b/c," the central processing unit of the calculator 20 can be reset to a fraction-display mode. This is accomplished through depression of a shifted key combination 28 and 40. This key sequence switches between fraction-display mode and the default decimal-display mode.

In the fraction-display mode, numbers are evaluated internally as decimal numbers, then displayed at 24 using the most precise fractions allowed. Implementation of this mode is as follows: First, using the above example, the key sequence: 12, ".", "3", ".", "8" is depressed. This displays characters as they are keyed in. "12 $\tfrac{3}{31}$" is displayed on display 24. An ENTER key 50 is depressed. This terminates digit entry and displays the number in the current default decimal display format. A shifted key combination 28 and 40 is then depressed. This displays the number as a fraction, "12 $\tfrac{9}{20}$."

To further the example, $\tfrac{3}{4}$ can now be added to the number "12 $\tfrac{9}{20}$" in the X-register (stack). The key sequence: 3, ".", ".", "4" or ".", "3", ".", "4" is depressed. This displays characters as the user keys them in. "$\tfrac{3}{4}$" or "0 $\tfrac{3}{13}$" is displayed respectively. Next, the (+) key 62 is depressed. This keystroke adds the numbers in the X- and Y-registers and displays the result as a fraction. "13 $\tfrac{1}{5}$" is displayed. Finally, the key sequence: ENTER 50 and shifted key combination 28, 40 is depressed. This switches to current decimal display format and "13.1250" is displayed.

Most Precise Fraction

With reference to the invention, many problems in number theory can be solved by making use of the well-known Theory of Continued Fractions. Information concerning this subject can be found in any number of references, including: G. Chyrstal, *Algebra*, Vol. II, Dover, New York, N.Y., 1961 or O. Perron, *Die Lehre von den Kettenbruchen*, Chelsea, New York, N.Y. which are hereby incorporated by reference.

As discussed in these and other references, an expression of the form $$a_1 + \cfrac{b_1}{a_2 + \cfrac{b_2}{a_3 + \cfrac{b_3}{a_4 + \ldots}}}$$

is known as a continued fraction. In general, the numbers $a_1, a_2, a_3, \ldots, b_1, b_2, b_3, \ldots$, may be any real or complex numbers, and the number of terms may be finite or infinite. The subject of the present invention is restricted to finite simple continued fractions. These have the form:

$$a_1 + \cfrac{b_1}{a_2 + \cfrac{b_2}{a_3 + \cfrac{b_3}{a_4 + \ldots + \cfrac{1}{a_{n-1} + \cfrac{1}{a_n}}}}}, \quad (1.1)$$

with only a finite number of terms $a_1, a_2, a_3, \ldots, a_n$. Such a fraction is called a terminating continued fraction.

A more convenient way of writing (1.1) is $$a_1 + \frac{1}{a_2} + \frac{1}{a_3} + \frac{1}{a_4} + \ldots + \frac{1}{a_n}, \quad (1.2)$$

where the + signs after the first "+" are lowered to indicate the "step-down" process in forming a continued fraction. It is also convenient to denote the continued fraction (1.2) by the symbol, so that $$[a_1, a_2, a_3, \ldots, a_n] = a_1 + \frac{1}{a_2} + \frac{1}{a_3} + \frac{1}{a_4} + \ldots + \frac{1}{a_n}, \quad (1.3)$$

The terms $a_1, a_2, a_3, \ldots, a_n$ are called the partial quotients of the continued fraction.

A rational number is a fraction of the form b/c where b and c are integers with $c \neq 0$. Every rational fraction, or rational number, can be expressed as a finite simple continued fraction.

For example, the continued fraction for the decimal value 2.45 is calculated as follow:

First, the characteristic (whole) part of the value, 2, is separated from the fractional part, 0.45. The characteristic is the term $a_1$. The fractional part is then inverted per equation (1.1) to determine the value of the term $a_2$:

$$\frac{1}{.45} = 2.2222$$

wherein the new characteristic is the term $a_2$, which equals 2. The new fractional part is then inverted to determine the value of the term $a_3$:

$$\frac{1}{.2222} = 4.5$$

wherein the new characteristic is the term $a_3$, which equals 4. The new fractional part is again inverted to determine the value of the term $a_4$:

$$\frac{1}{.5} = 2.0$$

wherein the new characteristic is the term $a_4$, which equals 2. The new fractional part is zero, indicating that in this example a perfect fractional representation of the decimal value 2.45 exists.

Expressed in the form of equation (1.1), the solution has the form:

$$2 + \cfrac{1}{2 + \cfrac{1}{4 + \cfrac{1}{2}}}$$

which equals $2 \tfrac{9}{20}$.

In the present invention, after each term $a_n$ is found, the denominator of the fraction is evaluated and compared to a maximum denominator specified by the user. If the evaluated denominator does not exceed the maximum denominator, the next term is evaluated. The evaluated denominator continues to grow until it exceeds the maximum specified denominator or the term has a zero fractional part.

Returning to the above example, assume that the user has specified a maximum denominator of 15. After the term $a_2$ is determined, the denominator is evaluated as 2:

$$2 + \frac{1}{2} = 2\frac{1}{2}$$

and the rational fraction has a value of $2\tfrac{1}{2}$. After the term $a_3$ is determined, the denominator is evaluated as 9:

$$2 + \cfrac{1}{2 + \cfrac{1}{4}} = 2\frac{4}{9}$$

and the rational fraction has a value of 2 4/9. After the term $a_4$ is determined, the denominator has a value of 20, which exceeds the maximum specified denominator of 15. Therefore, the fraction is displayed as 2 4/9, the most precise and reduced form of the fraction within the denominator range specified by the user.

In many cases, a perfect fraction will not exist for a value within the range of a calculator, such as for the number 2.314234234. Or a user may wish that the denominator be limited to simple values, such as 2 through 9. It is in such cases that the method of the invention has the greatest utility.

Referring to the figures, and according to the preferred embodiment of the present invention, the key is provided with a secondary function for displaying fractions and selecting a maximum denominator value. This is clearly shown in FIG. 1. The user may enter a stored denominator value by simply keying in the desired numerical value and depressing in succession key 30 and key 40 to actuate the "/c" function.

This procedure also turns on the fraction-display mode. To recall the "c" value to the X-register, the user depresses the key sequence: "1", key 30 and then key 40. To restore the default value of 4095, the user depresses the key sequence: "0", key 30, key 40.

The "c" function uses the absolute value of the integer part of the number in the X-register. It does not change the value in the "LAST X" register.

To select the most precise fraction format as contemplated, the user must change the states of two flags. Each flag can be "set" or "clear." To do this the user depresses the key 30 and then a flags key sequence: "left shift", "FLAGS" to get the flag menu. To set a flag, the user depresses SF and types the flag number, such as 8. To clear a flag, the user depresses CF and types the flag number. To see if a flag is set, the user depresses FS? and types the flag number. In the preferred embodiment, the user depresses a CLEAR key to clear the YES or NO response.

The following table shows how different numbers are displayed in the contemplated fraction format for a "c" value of 16.

| Fraction Format | Number Entered and Fraction Displayed | | | | |
| --- | --- | --- | --- | --- | --- |
| | 2 | 2.5 | 2⅝ | 2.9999 | 2 16/25 |
| Most Precise | 2 | 2½ | 2⅔ | 3 | 2 7/11 |

By way of example, suppose a stock has a current value of 48¼. If the stock goes down 2⅝, the user might want to know what the value would be or what would then be 85 percent of that value. Accordingly, with reference to FIG. 1, the key sequence: "left shift", "FLAGS", {SF}, "8", "left shift", "FLAGS", {CF}, "9" is depressed. This sets flag 8, clears flag 9 for "factors of denominator" format. Next, the key sequence: 8 (left shift) ("c") is depressed. This sets up the fraction format of the invention for ⅛ increments. Next, the key sequence: "48", ".", "1", ".", "4" (ENTER) is depressed. This enters the starting value. The display shows 48¼. Next, the key sequence: "2", ".", "5", ".", "8", "−" is depressed. This subtracts the change. The display shows 45⅝. Finally, the key sequence 85 (left shift) (%) is depressed. This finds the 85 percent value to the nearest ⅛. The display shows "▲38 ¾."

Figure 3:
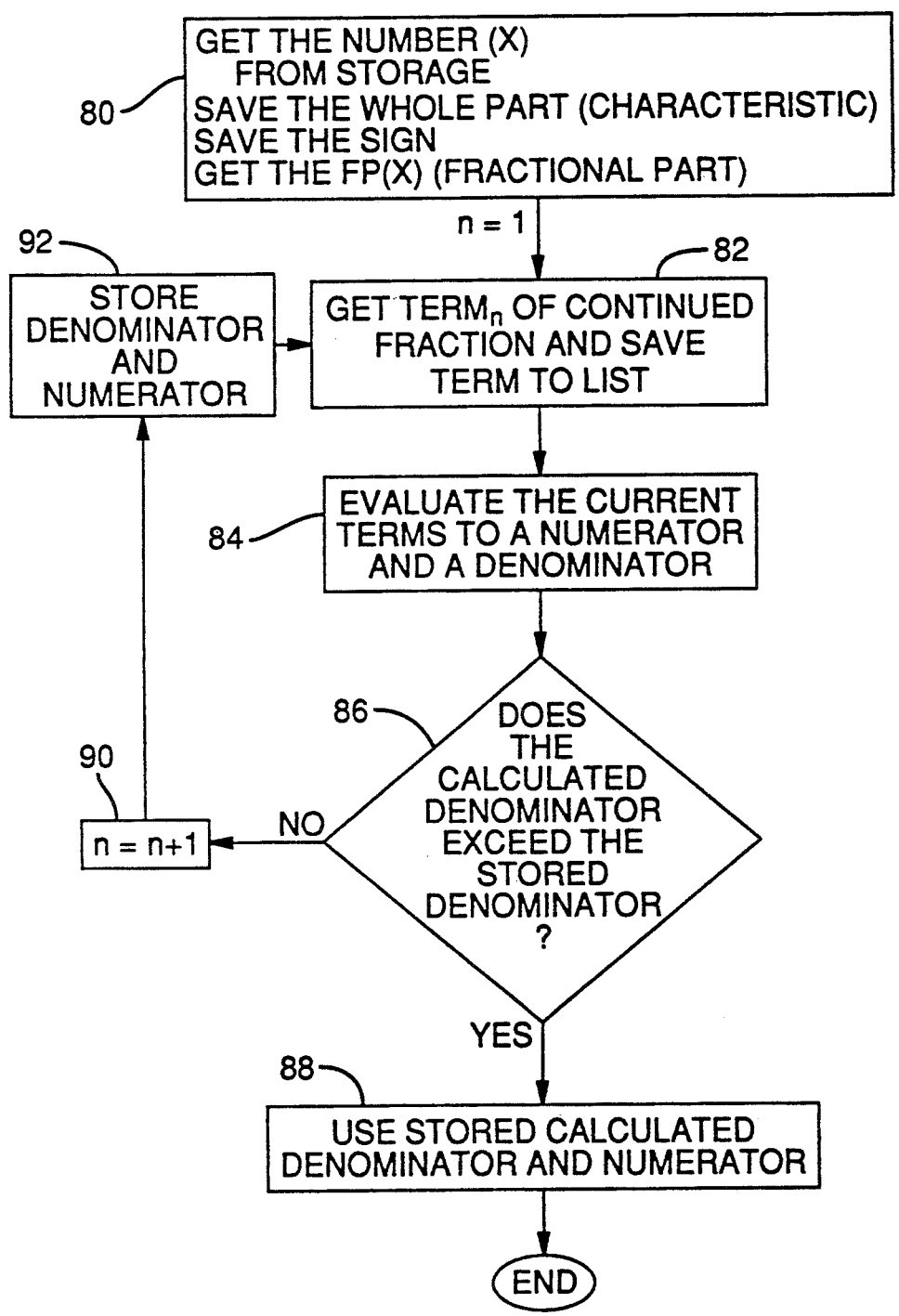
FIG. 3 shows a flow chart of a method according to the invention for the most precise fraction calculation and display.

FIG. 3 is a flow chart of the method for determining the most precise fraction. The decimal value is first retrieved from memory (80). The whole part (characteristic), the sign of the value, and the fractional part are separated and a term counter is set to one. The continued fraction technique is then utilized with the first term of the expansion (82). The current terms are then evaluated to a calculated numerator and a denominator (84). The calculated denominator is then checked to see if it exceeds the stored denominator (86). If not, the term counter is incremented (90) and the calculated denominator and numerator are stored (92). Steps 82-92 are then repeated until the most recently calculated denominator exceeds the stored denominator (86). The last stored denominator and numerator are then used as the most precise representation of the decimal value.

Having described and illustrated the principles of the contemplated invention with reference to a preferred embodiment, it should be apparent to those skilled in the art that the invention can be modified in arrangement and detail without departing from such principles. I claim all such modifications coming within the scope and spirit of the following claims.

I claim:

1. A calculator comprising
   (a) a display;
   (b) a keyboard having a plurality of keys for entering numeric values, for entering a maximum denominator and for initiating calculation of a fractional representation of an entered numeric value; and
   (c) a processor for:
      storing, upon activation by a user of a function key on the keyboard, a value entered into the calculator as the maximum denominator for a frictional representation;
      displaying on the display a numeric value entered into the calculator for which a fractional representation is desired;
      calculating, upon activation by a user of a function key on the keyboard, a most precise fractional representation of the entered numeric value in which the denominator of the fractional representation does not exceed the maximum entered denominator; and
      displaying the fractional representation of the entered numeric value.

2. The calculator of claim 1 wherein the function key for entering the maximum denominator and for initiating calculation of the most precise fractional representation are the same key.

3. The calculator of claim 1 wherein the fractional representation and the entered numeric value are different values, the entered numeric value being unaffected by the fractional representation thereof.

4. The calculator of claim 1 wherein the entered numeric value for which a fractional representation is desired is a decimal value.

5. In a calculator, a method of displaying a fractional representation, within a preselected range of denominators, of an entered numeric value, comprising
   pressing a key for recognizing a value entered into the calculator as a maximum denominator for a fractional representation;
   displaying a numeric value entered into the calculator for which a fractional representation is desired;

pressing a key for initiating the calculation of a most precise fractional representation of the entered numeric value in which the denominator of the fractional representation does not exceed the maximum denominator; and displaying, in response to pressing of the initiating key, the fractional representation of the entered numeric value.

6. The method of claim 5, wherein the calculation of the fractional representation of the entered numeric value comprises:

deriving a fractional representation of the numeric value with continued fractions; and comparing the denominator of the fractional representation after each subcalculation to the maximum denominator to determine if the denominator of the fractional representation exceeds the maximum denominator.

7. In a calculator, a method of displaying a fractional representation of a stored numeric value, comprising:

providing a key for entering a selected maximum denominator for the fractional representation;

providing a key for initiating calculation of the fractional representation;

entering a value as the maximum desired denominator;

pressing the entering key to recognize the entered value as the maximum desired denominator;

entering a numeric value for which a fractional representation is desired;

pressing the initiating key to calculate with continued fractions a fractional representation of the numeric value, the calculation including comparing after each subcalculation the fractional representation against the maximum desired denominator to ensure that the denominator of fractional representation does not exceed the maximum denominator; and displaying the fractional representation of the entered numeric value.

8. The method of claim 7 wherein the entering key and initiating key are the same key.

* * * * *